May 9, 1967   J. JULLIEN-DAVIN   3,319,019
TIMED CONTROL DEVICE WITH VARIABLE PROGRAMMED SEQUENCES
Filed March 30, 1965   3 Sheets-Sheet 2

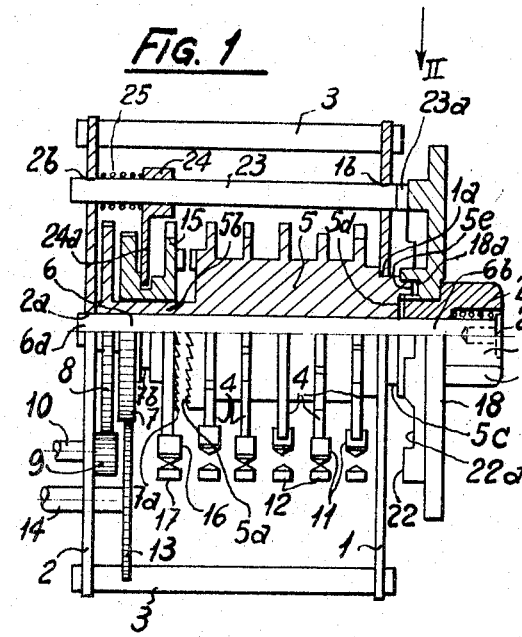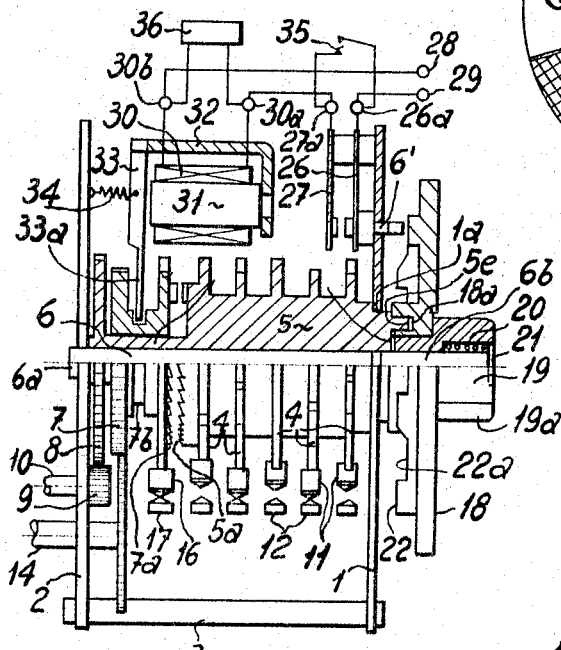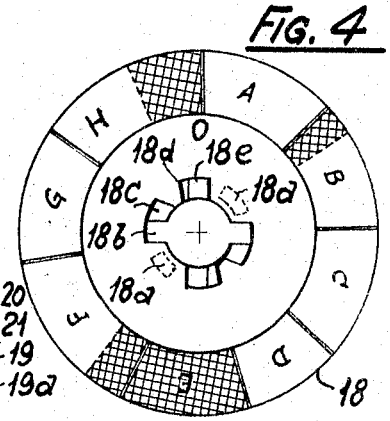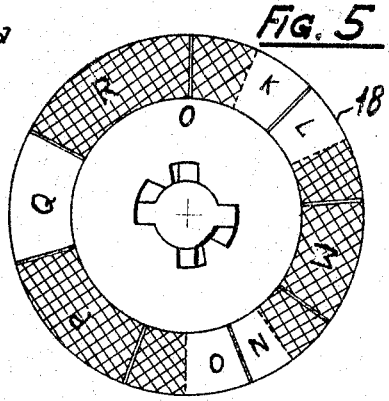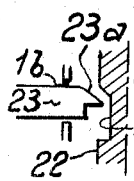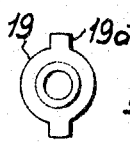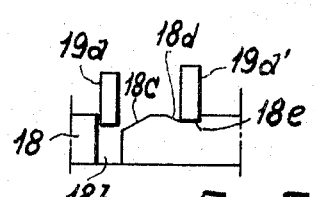

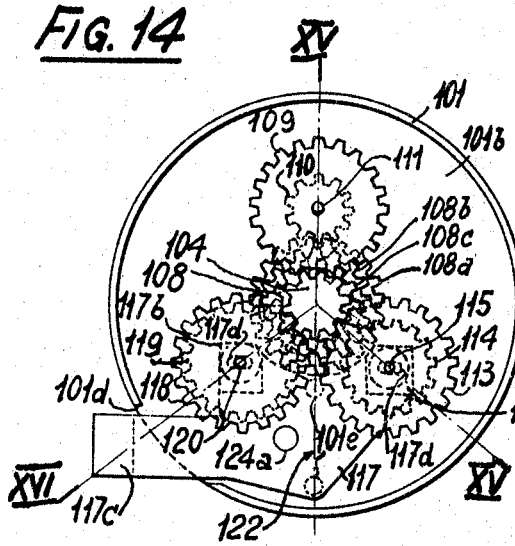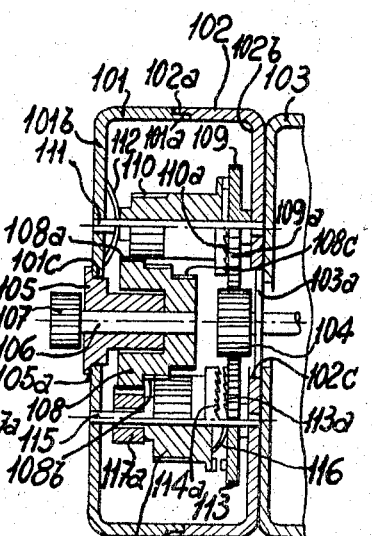

United States Patent Office 3,319,019
Patented May 9, 1967

3,319,019
TIMED CONTROL DEVICE WITH VARIABLE PROGRAMMED SEQUENCES
Jean Jullien-Davin, Valence-sur-Rhone, France, assignor to Crouzet S.r.l., Milan, Italy
Filed Mar. 30, 1965, Ser. No. 443,895
Claims priority, application Italy, Nov. 6, 1964, 23,841/64; Nov. 28, 1964, 25,670/64
19 Claims. (Cl. 200—38)

The present invention relates to a timed control device, and more particularly to the kind known popularly as a timer switch, and having as a specific characteristic the ability to skip certain steps of the timed sequence.

Electromechanical timer switches, driven by a small motor, usually electric, are well known. Such switches are usually formed by arranging a series of circular cams on a common spindle, and locating electrical switches so that, as the spindle rotates, the switches will be closed or opened, as the profile of the cam changes.

Timer switches in which the periods of closure or opening of specific contacts assigned to certain ones of the cams vary widely, require careful construction and adjustment of the contacts. If certain sequences to be timed are comparatively long, then the rate of rotation of the spindle on which the cams are mounted must be slow; on the other hand, the time taken for the contacts to close and open may then be unduly long for short sequences, and furthermore, damage to the contacts may result due to arcing.

Timer switches usually consist, as has been stated, of a series of essentially circular cams stacked on a spindle. These cams are permanently assembled, and the program or sequence once built into the timer switch cannot be changed after its construction.

It is an object of the present invention to provide a timer switch in which the duration of some of the sequences programmed into the switch can be changed.

It is a further object of the present invention to provide a timer switch in which the rate of rotation of the cams is variable, to provide for positive switching of contacts.

A particular application of the timer switch of the present invention could be illustrated in connection with the usual sequence timers of an automatic washing machine. Such sequence timers may have the following cycle: Wash; Spin–1; Rinse–1; Spin–2; Rinse–2; Spin–3. If it is now desired to skip, for example, either the first or second Rinse-Spin sequence (which may be of unequal duration), or to shorten either the Rinse or Spin periods, then serious difficulty in the construction of the switch is encountered. Furthermore, selective control of the time of rinsing and spinning must be built into the timer switch as constructed at the factory, and cannot be left readily to the selection by the user.

It is a further object of the present invention to provide a timer switch particularly for use in connection with a washing machine, in which the time of the sequence, or the occurrence of the sequence itself can readily be changed.

In accordance with the present invention, two drive inputs are provided to a timer switch. Both drive inputs may be derived from the same motor, for example through a gearing arrangement. The timer has its ordinary drive means, advancing, or rotating the cams either by means of a pawl and ratchet arrangement in step-by-step fashion, or by a continuously driven motor, to carry out the longest time program which the switch is designed to handle. A clutch, such as a saw-tooth drive arrangement, or any other positively engaging clutch, is provided in the drive train from the spindle to the cams. A control device, such as a control cam also driven by the spindle, is provided which, over a link mechanism, selectively disengages the cams from the drive and connects them to the higher speed drive input. The time of making such a connection, that is the occurrence with respect to the rotation of the cams, is controlled by this additional control device or cam. Thus, it is possible under control of the additional control cam, to rapidly rotate the cams so as to advance a certain function. By making the rotation fast enough, it is possible to so shorten the time of the function that, for all practical purposes, it is skipped, or eliminated.

The auxiliary cam or control device may be driven directly from the spindle, or over gearing. If the control cams rotate through a full cycle more than once to carry out a certain arrangement, such as for example, multiple rinsing and spinning in a washing machine, then the control cam can be geared and arranged in such a manner that a certain portion of time, for example the second revolution of the rinsing and spinning cams is speeded up, thus shortening the second rinsing and washing operations.

The additional control device, preferably a control cam, is mounted in such a manner that it can be interchanged with control cams having a different program. In one form, the control cam may have two faces, and whichever side is engaged by the linkage will then control the advance of the timer mechanism.

The actuating linkage itself may be directly, that is mechanically, controlled by the cam, or by means of an electrical solenoid. If the control is electrical, then the control device may consist of a disc having alternatively placed conductive and non-conductive portions, a conductive disc being masked by means of an insulating card or panel, or the like. Also, more than one track of electrical control may be provided on the control device, and the track selected by pushbuttons or selection mechanism in order to skip certain programs of the cams of the timing device.

By providing drive input to the timing cam at various speeds, the timing of various program steps can be selected. The control cam can be arranged in such a way that it causes changing of gears from a high to an intermediate and to a lower range, and by superimposition of various assemblies of three gears a larger number of ranges, may be made available as desired.

The structure, organization and operation of the apparatus according to the invention will now be described more specifically in the following detailed description with reference to the accompanying drawings, in which:

FIG. 1 is a side view, partly in section, of a timed control device according to the present invention;

FIG. 2 is a detail of the profile of the auxiliary memory cam, partly in sections;

FIG. 3 is a view similar to that of FIG. 1 showing an alternative embodiment;

FIGS. 4 and 5 show forms of auxiliary memory cams, in face view;

FIG. 6 is an end view of a fastening element for use with the cams of FIGS. 4 and 5;

FIG. 7 is a developed representation of a portion of the auxiliary cam illustrating the holding arrangement of the cam;

FIG. 14 is a front view of a three speed change gear, separate from the timing cam assembly;

FIG. 15 is a cross-section taken in line XV—XV of FIG. 14, developed on a plane;

FIG. 16 is a partial section taken on line XVI—XVI of FIG. 14;

FIG. 17 is an elevation of a part of the gearing of FIG. 14;

FIG. 18 shows an alternative embodiment of details of FIG. 17;

FIG. 19 is a preferred embodiment form for connection of a motor drive with a multi-speed changing gear, and reduction gearing; and FIG. 20 is an assembled view of a timing cam assembly fitted with a dual track memory cam, and a multi-speed changing gear arrangement.

Figure 8:
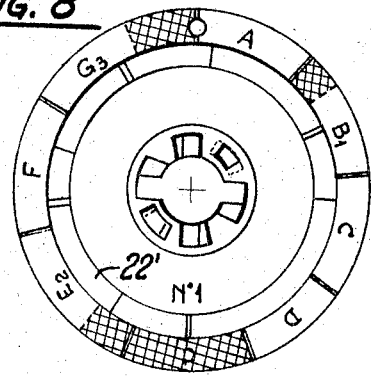
FIG. 8 is a front view of an auxiliary cam having operating faces on both sides.

Referring now to FIG. 1, a pair of flat side members 1 and 2, connected by spacers 3, form a cage within which stacked memory cams are arranged. Cams 4 may be formed integrally from one stock, as shown, or may be separate elements spaced from each other, for example by washers, and secured together. Five such cams are shown on the drawings, but any number may, of course, be used. These cams, as shown, are integral on a common hub or spindle 5, secured to a shaft 6. The end 6a of the shaft 6 is journalled in a hole 2a of side plate 2. The front side of hub 5 is serrated, or provided with sawtooth ridges, 5a. An end piece 5b, of smaller diameter than the remainder of the hub 5 extends towards the front end plate 2. A coupling wheel 7 is fitted over the portion 5b of hub 5, to be rotatable thereover, and slidable axially, that is lengthwise of the timed control device. The coupling wheel 7 is likewise serrated at its end, as shown at 7a, and arranged to face the mating serrations 5a of hub 5. Wheel 7, with its serrations 7a, is slidable over the hub end piece 5b, to an extent which is greater than the depth of the serration, so that the wheel can be brought into engagement to mesh with serrations 5a, or to be entirely clear therefrom.

A gear 8 is provided, secured over the end piece 5b of the hub 5, so as to turn therewith. This wheel can be secured to the hub in any known way, for example by means of a key, or by a force fit; it is preferred to make the gear 8 removable, to permit repair and access to wheel 7, although this is not shown in the drawing. Gear 8 engages with a pinion 9, secured to a shaft 10, which is journalled inside plate 2. Shaft 10 is driven by the drive means, such as an electric motor, for the entire assembly. Shaft 10 may be continuously driven, or rotated step-by-step, for example by a pawl and ratchet arrangement, well known in the art, and not shown.

So far, the operation of the timer switch device is similar to that of all ordinary timer devices—cams 4 have a circumferential outline which is designed for the program to be performed, to control contact elements 11, 12, schematically indicated and arranged on the device as is well known in the art. Contacts 11, 12 are connected to the operating circuits of the device to be controlled They are mounted on an insulating support, not shown for simplicity, in standard manner.

The circumferential outline of cams 4 is arranged in such a way that the function of the program to be performed causes sequential closing of contacts 11, 12, assigned to the respective cams. Since the cams 4 are either integral with hub 5, as shown in the drawings, or rigidly mounted thereon, the program determined by such a timer switch will be invariable.

It is possible to practically skip a step in the program by very rapidly turning the hub 5, and the cams 4, at a time or at an angular position of the cams, which brings the specific cam of the step to be skipped in closing position with respect to contacts 11, 12. The rapid rotation to the hub 5 is imparted by engaging the serrated faces 7a, 5a of wheel 7 and hub 5, and imparting high speed rotation to the wheel 7, by means of a meshing gear 13, mounted on a shaft 14, and likewise journalled in the front plate 2. Shaft 14 is connected to a source of high speed rotation, which may be the very same motor driving shaft 10, through an additional gear. Of course, the shaft 14 may be continuously rotating, although the shaft 2, and thus hub 5, are connected over a pawl and ratchet arrangement. Indeed, such a pawl and ratchet arrangement is desirable for shaft 10 because positive drive is imparted in only one direction and interference with a positive drive shaft 14 is avoided. Of course, any other well known mechanical drive connection providing for free wheeling of shaft 10 can be used. Wheel 7, near its serrated face, is preferably provided with a cam wheel 15, having associated therewith auxiliary contacts 16, 17. Contacts 16, 17 may be utilized, for example, for high speed switching in a reversing control of an automatic washing machine.

In most controllers currently used, a dial is provided which indicates the step of the program currently being executed. It is possible to advance the dial, and thus the program, manually. Thus, the first operation may be shortened, or omitted. It is difficult, however, to omit a step occurring in the middle of the regular program, unless the dial is continuously observed and manually advanced when the particular step of the program is being reached. In order to shorten a particular intermediate step, or to skip it entirely, it is usually necessary to completely disconnect the electrical circuit and then change the sequence in which the steps are to be performed, or the timing thereof. According to the present invention, it is unnecessary to observe the dial and determine when a particular step is being reached, and to disconnect the controller and the ordinary sequencing of the program.

In order to skip, or materially shorten a step, an additional control element which preferably is in the form of an auxiliary cam, is provided. This auxiliary cam is shown in FIG. 1 at 18, and fitted to end face 5d of the hub 5. Auxiliary cam 18 is secured to the end face 5d in a manner to be described, so as to have a specific angular position with respect to the hub. The auxiliary cam 18 is provided on the face thereof, with a profile track 22 (FIG. 2) which cooperates with a feeler end 23a of a pin 23 (FIGS. 1 and 2), slidingly secured in bore 1b of side plate 1 and bore 2b of side plate 2. A bifurcated arm 24 (FIG. 1) is secured to pin 23. Arm 24 cooperates with and engages a groove 7b in wheel 7, in order to control the axial position of the wheel 7 and engagement of serrated face 7a with the serrated face 5a of the hub 5. A spring 25 urges pin 23 and its feeler end 23a into engagement with cam face 22 of auxiliary cam 18.

When cam face 22 of cam 18 has a depression, as shown at 22a, FIG. 2, spring 25 will urge the feeler end into the depression, bifurcated arm 24 will shift rapidly rotating wheel 7 towards the serrated face 5a of hub 5, imparting rapid motion to the hub. When a projection, or rise is present on cam face 22 of cam 18, the gear 7 will be shifted out of engagement with hub 5, and normal indexing and rotation of hub 5 will continue. The duration of rapid rotation of the hub 5, of course, is given by the extent of depression 22a in cam face 22 of cam 18. If the rotation is rapid enough, contacts 11, 12 of the rapidly rotating cams will engage only very briefly, for such a short period of time that the mechanical inertia of the device to be controlled will be unable to carry out the program step, and in effect, the program step will thus be skipped.

FIGS. 4 and 5 illustrate, schematically, arrangements for rises and depressions of the auxiliary cam 18. Depressions in the cam, indicating that a step, or a particular time for the step, is to be skipped, are indicated by the cross-hatched area in the drawings.

FIG. 4 illustrates an auxiliary cam for use, for example with a combination washer-dryer, as it might be arranged for fine or delicate fabrics. The regions defining areas on the cam are indicated by the double lines. Area A could, for example, be a washing cycle. Area B—spinning in a washing machine, which is, however, shortened for use with fine fabrics, as indicated by the cross-hatched area taking out a certain period of time during which spinning might occur. Area C may represent a rinse cycle; area D a spinning cycle; area E a second rinsing cycle, which however, is skipped because one rinse is deemed sufficient for the particular fabric. Because the fabric is to be dried, additional spinning time is added. An entire additional spinning cycle is not necessary, however, and region F indicating the next spinning operation is foreshortened. Region G may represent a heating cycle and region H a drying or exhaust step, which is also shortened for the particular fabric.

FIG. 5 indicates a cam which may be used with, for example, an automatic dish washer. As in FIG. 4, the regions are labeled by letters, and the cross-hatched areas indicate depressions, that is those regions where feeler end 23 will engage the surface 22a causing, through arm 24, rapid rotation of hub 5. Starting, clockwise, around the cam of FIG. 5, region K may represent a first rinse which is shortened; it is followed immediately by a second rinse (thus, causing less wear on running contacts and starting motors), but the second rinse is shortened as indicated by the cross-hatched area within region L. A first wash cycle, area M, is skipped entirely; also the initial portion of a second wash cycle is skipped, see region N; a portion only of the third wash cycle is retained; the remainder is skipped, see cross-hatched area in region O. A first rinse, region P is skipped entirely. A second rinse, region Q, is used; and a drying step, region R, is skipped entirely. This program may be useful, for example, for fine glassware which is not to be exposed to drying temperature which may cause damage.

The cams are preferably arranged with a visual index mark, not shown on the drawings, permitting the user to observe the particular region and thus the steps to be carried out, or to be skipped.

If other types of fabric, or different uses for the device are intended, it would not be necessary to replace the entire timer or to arrange for an entirely new cam assembly; it would only be necessary to furnish the user with a new, auxiliary control cam for use with particular fabrics or goods, to shorten, or entirely skip, steps of the normally arranged program.

Referring now to FIG. 3, an alternative embodiment to that illustrated in FIG. 1 is shown. Those parts which are identical to those in FIG. 1 have the same reference numerals. The drive mechanism, cams 4, hub 5 and the general assembly, are similar to that of FIG. 1. The difference is in the control of the engagement of wheel 7.

A pushbutton 6' is slidably mounted in end plate 1, to engage with depressions and rises on face 22 of cam 18. For clarity, the length of pushbutton 6' is foreshortened. Push button 6' operates contact springs 26, 27, mounted on an insulator on end plate 1. Terminals 26a, 27a of contacts 26, 27 may be connected to a manually operated switch 35, which can be used to override the program to be established by face 22 of auxiliary cam 18. Electrical supply lines 28, 29 provide energy through contacts 26, 27, or switch 35, as the case may be, to the winding 30 of a solenoid 31, secured on a bracket 32 to the controller assembly in a suitable manner not shown. A movable armature 33, which may serve at the same time as the control element similar to arm 24 of FIG. 1, engages in groove 7b of wheel 7 to provide for engagement or disengagement of serrated faces 5a, 7a. A spring 34 biases the armature 33 toward a position for disengagement of serrated faces 5a, 7a. A relay 36 may be connected in parallel with solenoid 31, as shown, by connection to terminals 30a, 30b. This relay may provide for interruption of specific circuits in the device to be controlled, when a step is to be skipped; for example, referring to the cam of FIG. 4, the second rinse step E is to be skipped. The relay may be arranged so that when the solenoid is energized, contacts controlling the agitator motor of a washing machine are disconnected, thus preventing arcing at the control contacts for the agitator motor, when cams 4 rotate rapidly during the step E, the second rinse, normally to be skipped.

The switch 35 can also be used to rotate the entire assembly rapidly to its terminal, or OFF position, or to provide for fast resetting, or initial setting to a particular position.

Auxiliary cam 18 is secured to the assembly by means of an end loaded, snap-in wing collar or pushbutton 19, to provide for quick assembly and disassembly, and provide for positive seating in a predetermined position with respect to the particular position of hub 5. The pushbutton 19 is fitted loosely over the end 6b of shaft 6. Internally thereof, a spring 20 is arranged which bears against the screw 21 tapped into the spindle 6. Cam 18 is formed with a circular bore, having two laterally extending notches 18b (see FIG. 4), and pushbutton 19 has two equally extending lateral wings 19a, see FIG. 6. Notches 18b are slightly larger than the wings 19a. Adjacent the notches 18b, two inclined planes 18c are arranged, in such a manner that wings 19a can slide thereover. Inclined planes 18c reach the level of the face of cam 18, and then continue into further small recesses 18e over another small inclined region 18d. A developed outline is shown in FIG. 7, with the wings 19a schematically indicated. The position of the wings 19a, when seated in the recess 18e is indicated at the cross-hatched position. The spring 20 will retain disc shaped auxiliary cam 18 securely against the end face 5d of hub 5. Preferably, end face 5d also contains a locating projection 5e, fitting into matching locating recesses 18a, as shown in FIG. 4, to provide for positive alignment of the position of cam 18 with respect to the hub 5. As illustrated in FIG. 4, the recesses 18a, although diametrically located for balance, are of unequal size. For the purpose of illustration, similar showings of this fastening mechanism in FIG. 5 have been omitted.

Figure 9:
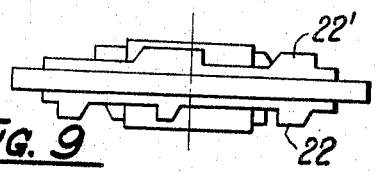
FIG. 9 is a side view of the cam of FIG. 8.

FIG. 8 illustrates one face of a reversible cam, and FIG. 9 is a side view thereof. The rises and depressions of the auxiliary cam on one side, for example cam track 22, are chosen to be similar to those of FIG. 4, and similarly indicated by cross-hatching. The rises and depressions on the other side, 22', are also illustrated in FIG. 8. It is to be noted that the sub-divisions of the length of the rises and depressions need not be the same. These rises 22' are shown to be visible since the auxiliary cam may be made of transparent plastic.

Figure 10:
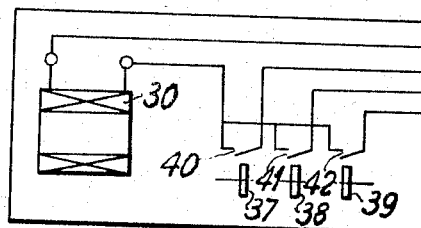
FIG. 10 is a circuit diagram illustrating an embodiment of conecting control circuits.

FIG. 10: The auxiliary cam can also be utilized to control the circuits connected with any one of the other, regular cams 4; for example, the auxiliary cam can be utilized to completely disconnect the circuits controlled by the last or right hand side cam (FIG. 1) contacts 11, 12 or any group of them, which contacts may control a particular operation of a device, for example a drying or a spinning cycle in a washing machine. The projections, or depressions as the case may be in view of the connections of the switch elements or contact springs 26, 27 (FIG. 3) are schematically illustrated by blocks 37, 38, 39. These differences in surface control switches 40, 41 and 42. An external selector box 43, having pushbuttons 44, 45 and 46 to control switches 47, 48 and 49 is connected to be in series with each one of the switches 40, 41, and 42, respectively, and with the supply line 28, 29, for the solenoid 30. By closing any one of the contacts 47, 48 or 49, the particular cam to be effective, that is whether cam 37, 38 or 39 will be effective to operate switches 40, 41 or 42, respectively, can be selected. The pushbuttons 44, 45, 46, are preferably provided with an interlock to prevent operation of more than one button at a time. Remote selection of a program can thus be effected.

In order to provide for positive operation of switches, it was necessary in the past to increase the diameter of the cams when the program was to extend over an appreciable period of time, so that the surface speed of the cam would still be sufficient to interrupt or make a contact rapidly. The use of an auxiliary cam, in accordance with the present invention permits extending the time that the controller can effectively control a device such as a washing machine or machine tool, for example.

Figure 11:
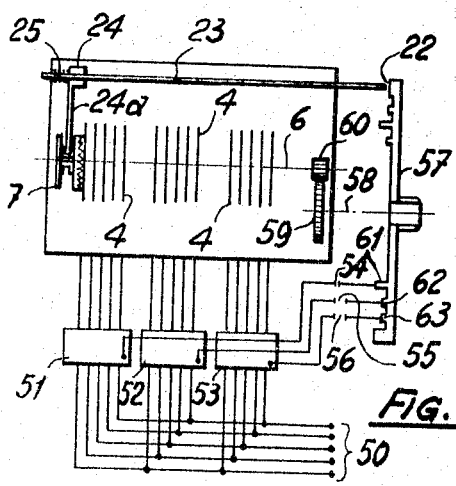
FIG. 11 is another embodiment of the timed control device, illustrating electrical connections.

Referring to FIG. 11, the auxiliary cam 57 is secured to a spindle schematically shown at 58, connected to a gear 59. The meshing pinion 60 is attached to the spindle 6 of the main drive of the device. The number of cams 4 is increased, for example, is trebled as shown in FIG. 11. Each one of the cams, which may be arranged in groups of five as shown, are connected to separate groups 15 of terminals, having separate contacting devices, 51, 52, 53, each one controlled in turn by its own control contacts 54, 55, 56. The auxiliary or memory cam 57, which may be similar to cam 18, FIG. 1, has a track 22 similar to track 22 of FIG. 1. Additional contacting tracks are provided, see FIG. 12. These contacting tracks 61, 62, 63 have conductive, or active sections and non-conductive or inactive sections. Preferably, the conductive sections slightly overlap to prevent opening and closing of the contacts at the same time and thus of arcing. The extent of the overlap is preferably so chosen that the time of rotation of the auxiliary cam 57 to cover a period of overlap is equal to the time of one indexing step of spindle 6.

In the course of one revolution of the cams 4, contacts 54 are switched ON, thus connecting the terminals 50 (FIG. 11) of the operating circuits with the contacts which are controlled by the first group of five cams, that is under control of contactor 51. During the last step of the first revolution, contact 55 is closed by track 62, thus also connecting terminals 50 to the contacts controlled by the second group of five cams through contactor 52. At the end of the first complete revolution, contact 54 is switched OFF, contactor 51 opens and terminals 50 are controlled entirely in acordance with the program of the second group of the cams 4, through the now energized contactor 52. For the third revolution, the same sequence will occur, contactor 53 taking over from contactor 52 under control of terminal 56 engaging track 63.

Preferably the program is arranged in such a manner that no switching occurs during the last step of each complete revolution, so that the contactors only switch over the contacts themselves, without, however, causing switching of operating energy through terminals 50. Thus, if no breaking or connection of operating current occurs, the contactors themselves need not be of expensive construction.

Figure 12:
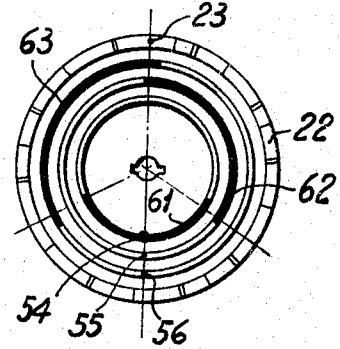
FIGS. 12 and 13 are face views of cams for use in the invention according to FIGS. 10 and 11.
Figure 13:
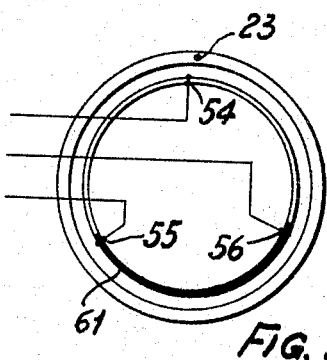

FIG. 13 illustrates a variation of a cam similar to that shown in FIG. 12, but having only a single track 61, and contact elements 54, 55, 56, spaced around the circumference thereof. The operation and function of the contact track of FIG. 13 is similar to that discussed in connection with FIG. 12.

Of course, the contact track itself could be arranged to be stationary, on the housing of the device itself, for example applied in form of a printed circuit on a slip ring, on end plate or side member 1 (FIG. 1), and the cam itself could carry one or more contact brushes.

The auxiliary cam can be driven directly from the spindle 6, as illustrated in connection with FIG. 11, or it can be connected to a separate drive shaft, for example by extending shaft 14, FIG. 1, through the end plate 1 and providing a gearing drive to the cam 18. Thus, although spindle 6 may advance in step-by-step fashion, for example by means of a pawl and ratchet arrangement, the cam 18 will rotate continuously. In such a construction, of course, the mode of securing auxiliary cam 18 to the spindle discussed in connection with FIGS. 4 and 5 will have to be modified; to assure synchronism, index marks indicated on end face 5d of hub 5, and on the cam itself, can be used to assure accurate alignment.

Rather than rotary motion, translatory motion can also be used. Thus, a feed screw could be used to advance a contact member, making or breaking contacts for a certain period of time, and in accordance with a certain pattern, as determined, for example by punch cards or a printed circuit. An auxiliary cam can then be utilized to provide for rapid advance of the contacting mechanism so that certain steps will be passed by quickly, or skipped entirely, similar to the rapid rotation imparted by shaft 14, gear 13 and coupling wheel 7, FIG. 1.

So far the invention has been discussed with a single high speed drive input from shaft 14 (FIGS. 1, 3), obtained through external gearing from a motor. The normal or ordinary low speed drive input is applied over shaft 10. It is, however, also possible to have multi-speed inputs, and the gearing arrangement therefor may be external to the timer cam assembly, comprising timer cams 4 and their associated contacts, themselves.

Ordinary gear changing arrangements are not satisfactory for use with a timer arrangement according to the present invention, because there is usually a brief interval, or dead zone which occurs during changing of the speed. During such dead zone, or interval, the assembly ceases to rotate and thus the position of the mechanism which causes the switchover of the gearing itself does not change because its position is controlled by the rotation of the control cam (18, FIG. 1) which also has stopped. It is possible, of course, to aid the changing of the gears by the use of springs, or by rapid change of profile of the control cam; such expedients, however, do not always result in the best possible operation, and rapid change of profile of the cam may not be in accordance with a desired program. Some modification of the structure of FIG. 1 is necessary, which is not specifically shown in the drawings, in order to provide for clarity. The entire assembly of serrated wheel 7, its driving gear 13, and shaft 14 is omitted. Shaft 10, engaging pinion 9 and gear 8 is provided with a reduction gearing of such kind that it will be capable of meshing with a gear, concentrically arranged with shaft or spindle 6. The change speed mechanism for this gear, under control of the control cam 18 and either by mechanical means (pin or push rod 23, FIG. 1) or electrical means (solenoid 31, FIG. 3) will now be explained with particular reference to FIGS. 14 through 18.

Referring now to FIGS. 14 and 15, a change gear assembly is arranged in its own housing, outside of the stacked assembly 1, 2, 3 of FIGS. 1 and 3. By providing the change gear assembly as a separate unit, gearing arrangements having various transmission ratios may be provided, and a single timer assembly may be outfitted with variously timed programs by mere change of the entire gearing sub-assembly. FIG. 15, which is reversed left to right with respect to FIG. 1, for ease of illustration, shows a housing for the gearing, 101, 102, which preferably is formed of separate half shells, press fitted together as at 101a, 102a (FIG. 15). Shells 101, 102 have end plates 101b, 102b, respectively, having therein center openings or bores 101c, 102c. A motor 103, shown only schematically by its own housing, provided with an output shaft having a pinion 104 thereon, is secured to end plate 102b. A bearing, not shown, is located in opening 102c, and similarly, a bearing 105 is fitted into opening 101c of cover 101b. Bearing 105 accurately centers the shaft 106, on which a drive wheel or pinion 107 is arranged . Drive wheel 107 is designed to co-operate with reduction, or other gearing, which in turn engages shaft 10 of the drive assembly for the timing cams (FIG. 1).

Bearing 105 is held in shell end 102, for example by means of a lip 105a. Shaft 106 passing through the bearing, is provided with a stepped gear or pinion 108. The entire assembly of gear 107, shaft 106, stepped gear 108, motor shaft and pinion 104, is arranged concentrically.

Pinion 104 is arranged to drive the largest diameter gear of stepped gear 108. The largest diameter step of gear 108, shown at 108a (FIGS. 14 and 15) is in driving engagement with a pinion 110, loosely fitted on the shaft 111, journalled in the end plates 101b, 102b. Pinion 110 has formed on the edge thereof serrations or teeth 110a, which mesh with similar serrations or teeth 109a, of a pinion 109. Pinion 109 is in driving engagement with the output pinion 104 of the motor. In order to keep the edge serrations 109a, 110a engaged, a weak leaf spring, such as for example a bent washer 112, surrounding shaft 111 on which the assembly is journalled, bears against the housing, as shown in FIG. 15. Thus, pinion 104 of the motor drives the pinion 107 over pinion 109, serrations 109a, 110a, pinion 110 and the largest diameter gear of wheel 108. The largest speed reduction from the drive motor to the pinion will thus be obtained due to the engagement of gear 110 with the largest diameter step of wheel 108.

In order to provide for multiple gearing, which is always in engagement, additional shafts carrying additional gearing are arranged equidistant from the axis of spindle 106. Referring again to FIGS. 14 and 15, shaft 115 is journalled in end plates 101b, 102b, carrying thereon a drive wheel 113, in driving engagement with pinion 104. Drive wheel 113 has edge serrations 113a, designed to mesh with edge serrations 114a of a pinion 114, in driving engagement with the center gear 108b of the stepped wheel 108. Wheel 114, as well as drive wheel 113 are loose on shaft 115, similar to the arrangement of pinions 109, 110 on shaft 111. The serrated faces 113a, 114a are kept spaced from each other by a weak spring 116, which is a bent washer, or a spiral spring 121, surrounding the shaft may be used, as shown more particularly in connection with FIG. 16. The end of pinion 114 remote from the serrated face 114a, is in engagement with an arm 117a of a rocker lever 117.

A third gear is provided, formed of a wheel 118, meshing with the pinion 104, and a pinion 119, meshing with the third and smallest step 108c of wheel 108. Again, pinion 119 and pinion 118 are loosely fitted on a shaft 120, secured in the end plates 101b, 102b of the gear housing. The spiral spring 121 separates serrated faces 118a, 119a from each other. The two forms of the springs, leaf spring 116 (FIG. 15) and spiral spring 121 (FIG. 16) are shown in alternative forms merely to illustrate different possibilities. For ease in assembly and mass production, it would be preferred to have all springs of the same form and kind.

The end of pinion 119 remote from the serrated face 119a is in engagement with an arm 117b of rocker lever 117. Rocker lever 117 (FIG. 17) is pivotally arranged about an axis 122, located horizontally, and perpendicular to the plane passing through shafts 115, 120 as will presently become apparent. The lever 117 is provided with a control arm 117c (FIG. 14, FIG. 17) projecting outside of shell 101, through a side opening 101d.

Arms 117a, 117b are crossed by shafts 115 and 120, passing through holes 117d of sufficient size to provide for swinging motion of rocking lever 117. When the rocking lever is in its center position, serrated faces or teeth 113a, 114a on the one hand, and 118a, 119a on the other are out of engagement with each other. Driving connection is obtained from pinion 104 to output pinion 107 at the lowest gear ratio, by means of wheel 109 and pinion 110, in mesh with the step 108a of wheel 108. When rocking lever 117 is swung in one direction, for example when spring 116 is compressed, teeth 113a and 114a are brought in engagement with one another. A driving connection is then established by wheel 113 and pinion 114, in mesh with a second step 108b of wheel 108, with a speed reduction which is less than that obtained by wheel 109 and pinion 110. The serrated faces 109a, 110a will then be overridden, and wheel 110 will move back and forth as the teeth slide over their edges, against the pressure of the weak spring 112.

When rocking lever 117 is swung in the opposite direction, serrated faces 118a and 119a will be brought into mesh or engagement with each other. Driving connection is then established by means of wheel 118 and pinion 119 in engagement with the last step 108c of wheel 108. Pinion 107 is driven at its highest speed from motor pinion 104. The operation of the switchover of gears is particularly illustrated in FIG. 17, which also shows by way of example a particularly advantageous form of the rocking lever 117, which lends itself to inexpensive mass production.

Rocking lever 117 is not flat, but is angled so that arms 117a, 117b and 117c are in different planes. At the convex side, a pair of protrusions 117e are made, for example by punches, which fit into a pair of holes 101e formed in front plate 101b of the housing 101. The holes 101e are spaced along the axis 122 (FIGS. 14 and 17). Preferably, the punch marks 117e are spherical although due to the small amplitude of the swinging motion, any deformation which permits some play and engagement of the rocking lever 117 in the opening will suffice. The rocking lever 117 is urged to swing in the direction of the arrow A (FIGURE 17), by a spring 123, attached to a spindle 124 and adjustable, for example by a screw head 124a, and secured in end plate 101b of the housing. Push rod 125, which may be an extension of pin 23 (FIG. 1) or operated by the armature of the relay 30, 31 (FIG. 3) controls motion of the rocker 117. Preferably, the push rod is provided with an end adjustment screw 126, and a lock nut 126a, to provide for adjustment of clearance between the serrated faces 113a, 114a and 118a, 119a, respectively, and for easy assembly. The control arm 117c of rocking lever 117 is spherically shaped for tangential engagement with the push rod 125 regardless of the position of rocker arm 117.

An alternative adjustment of rocker arm 117 is shown in FIG. 18; adjustment screw 126' having a spherical end, bears against push rod 125. The adjustment screw is again provided with a locking nut 126'a. The spring holding arrangement for the rocking arm 117 may likewise be different; for example, a shaft 124' similar to shafts 115, 120, may be mounted across the assembly and from end plates 101b, to 102b, and surrounded by a long spiral spring 123'. Thus, the number of different parts, and assembly steps necessary, is reduced.

The rocking lever 117 needs only a very small displacement by the push rod 125 in order to engage either the one or the other of serrated faces 114a, 119a, respectively. Thus, the control cam 18 (FIG. 1) can operate the change gear mechanism directly, without further linkages to amplify the displacement. Likewise, the relay armature 33 (FIG. 3) could operate the push rod directly.

The gearing arrangement disclosed lends itself to mass production, since the various gears, shafts and bearings may all be designed to be similar to each other. The shafts can be force fitted in a bore of either one of the walls 101b, 102b and slidingly inserted in the opposite wall. To facilitate assembly of the rocking lever 117, the initial assembly is preferably force fitted into wall 102b, and wall 101b is then slid thereover, and attached at 101a, 102a (FIG. 15).

A particularly simple way of securing a motor 103 to the change gear assembly is shown in FIG. 19, where an additional reduction gearing assembly 127, interposed between pinion 107 (FIG. 15) and drive shaft 10 (FIGS. 1 and 3) is also shown. The reduction gearing itself may be standard and an assembly well known in the art.

The diameter of shells 101, 102 is preferably selected to be the same as that of the shell of motor 103. Preferably, the diameter of the shell for the reduction gear 127 is also equal to, or only slightly larger than the diameter of the motor and the change gear mechanism.

An extension of the motor shaft 103a is centered in the central bore 102c of the cover 102 of the change gear. The extension as lip 105a of the bearing 105 (FIG. 15) is likewise centered in a bore 127a of the reduction gear box 127. The three units are tightly kept together by a resilient clamp 128, having a body or back element which may be flat or circular, resting elastically on the bottom of motor 103, and having two arms with bent over ends or hooks 128b engaging in small ears or projections 127b, punched out from the side walls of the gear housing 127. Obviously, similarly shaped pieces, screws or the like may be used to fasten the assembly together as well. The disclosed method of assembly is simple and provides alignment of the various elements along their own axis, which is particularly advantageous in order to properly align control arm 117c in the most suitable position with respect to the push rod 125 (FIGS. 17, 18) forming an extension of pin 23 (FIG. 1) or of the armature 33 (FIG. 3).

The gear change mechanism may either be substituted for the elements involving the high speed rotation disclosed in connection with FIGS. 1 through 13, or may be added thereto, in order to provide additional control, or programs of the timing assembly at additional speeds. The output of pinion 107 (FIG. 15) may thus be applied not only to a reduction gear 127, but also to a drive which engages with the high speed shaft 14 (FIGS. 1 and 3). An assembly of the speed change gear mechanism with the entire unit, for example as illustrated in FIG. 1, is shown in FIG. 20. Speed change mechanism in housings 101, 102, motor 103 and reduction gearing 127, all held together by clamp 128, and as disclosed in connection with FIG. 19, is secured to the stacked assembly, for example as illustrated in FIG. 1, and schematically indicated at 129. Auxiliary control cam 18, which may be removable, or have a pair of faces as disclosed in connection with FIG. 9, controls pin 23. This cam is provided with a further additional outside control track 22m, directly engaging push rod 125, which operates the rocker arm 117. Thus, as the cam rotates, different speeds may be arranged for different points of the program. Of course, cam 18 may be double faced, as illustrated in FIG. 9, and is preferably removably mounted. Of course, if desired, a manually accessible override may be provided so that the change gear mechanism can be operated manually. Push rod 125 may be made in a plurality of sections, for example telescopically arranged with a fairly strong spring, sufficient to positively operate rocker arm 117, but capable of being overridden by manual pressure.

A plurality of gear change arrangements can be stacked in axial alignment with each other, and a plurality of tracks 22m arranged on cam 18, with separate push rods 125 for each. Thus, a larger number of speed change possibilities can be obtained, particularly when the gear ratios between the gears of any one assembly is different from the gear ratio of another one. The only different part necessary to provide for such additional combinations or changes is a clamp 128 of different length, and a push rod 125 of different length. So, with two change gear arrangements of similar gear ratios, six combinations of speeds are possible; if the gear ratios are different, there will be nine combinations.

The present invention, therefore, provides, in its most brief and simple form, a stacked timer assembly in which a plurality of disc-like cams 4 are arranged on a movable support, such as a rotatable hub 5. Drive means, such as the gear 9, are provided to rotate the cams. An auxiliary control cam 18 (FIG. 1) carrying a control surface is in driving connection with the drive means, either directly or by means of an auxiliary gear which may have a gear ratio other than 1 to 1. The auxiliary cam controls connection of the cams to a high speed drive, so that the normal program of the cams as controlled by their normal rotation from gear 9 is interrupted, because of their rapid advance for the duration of the connection of the high speed drive means. Program steps occurring during the interruption will succeed each other in rapid sequence, as governed by the speed of the connected high speed drive means.

Additionally, the auxiliary cam may control connection of the cams to multi-speed drives, to change the duration of a program. Such multi-speed drives are preferably arranged separate from the assembly to provide for ease of manufacture and interchangeability of parts. The multi-speed drive is equipped with an over-riding clutch, and arranged in such a way that the lowest speed gear is always engaged, and as the higher speed gears become engaged, the clutch for the lowest speed gear is overridden and runs free. Thus, a drive connection to the cam is always provided, avoiding a dead zone or possible stopping during gear changing.

The inventive concept has been illustrated and described as embodied in a rotary timer switch, particularly adapted for use with washing machines, washer-dryers, dishwashing machines and the like. It is not intended to be limited to the detailed showing, since various modifications and structural changes may be made. By applying current knowledge, the inventive concept may be adapted to various applications to control any sequential steps. Thus, modifications in structure, arrangement, proportion, and conventional elements and components used in conjunction with practicing the invention, and which are particularly adapted for specific environments and operating requirements, may be made, without departing from the principles of the present invention.

What is claimed is:
1. In a timed control device, in combination:
  (a) drive means;
  (b) a plurality of cams;
  (c) means drivingly connecting said drive means to said plurality of cams;
  (d) a high speed drive input;
  (e) a control cam having a face defining a program, said control cam being drivingly connected to said drive means;
  (f) overriding clutch means connected to said plurality of cams and to said high speed drive input for transmitting high speed movement of said input to said plurality of cams; and
  (g) a push rod member engaging said face of the control cam and said clutch means for operating said clutch means according to said program.

2. A timed control device according to claim 1, said drive means being a rotatable spindle rotating said cams, a gear rotatable with respect to said spindle surrounding the spindle, said high speed input engaging said gear.

3. A timed control device according to claim 1, said plurality of cams and said control cam forming a stacked assembly.

4. A timed control device according to claim 3, said plurality of cams, and said control cam being arranged co-axially, said control cam being at the end of said stack of cams and being removably secured to said drive means.

5. A timed control device according to claim 3, including means driving said control cam at a speed different from the speed of said drive means.

6. A stacked timer assembly for controlling a program comprising a support cage; a plurality of disc-like cams enclosed in said cage; a spindle journaled in said cage and rotatably supporting said cams in axial alignment; free wheeling drive means engaging said spindle to rotate said cams; a high speed drive means; a plurality of interchangeable auxiliary control cams, each adapted to be secured to said cage in driving relation to said spindle, one of said auxiliary control cams being removably secured outside of said cage in drive connection with said spindle; and means controlled by said auxiliary control cam, connecting said spindle to said high speed drive means, whereby the normal program is interrupted for the duration of connection to said high speed drive means, and the program steps occurring during said interruption will succeed each other in rapid sequence as governed by the speed of said then connected high speed drive means.

7. A stacked timer assembly according to claim 6, including index means associated with said spindle and said one auxiliary cam whereby the relative circular position of said auxiliary cam and said spindle, and thus said disc-like cam, will be determined.

8. A stacked timer assembly according to claim 6, said control cam having control surfaces on both faces.

9. In a timed control device, in combination:
   (a) drive means;
   (b) a plurality of cams;
   (c) means drivingly connecting said drive means to said cams;
   (d) a high speed drive input;
   (e) an overriding clutch means interposed between said high speed drive input and said plurality of cams, said clutch means being engageable for drivingly connecting said input to said plurality of cams;
   (f) clutch actuating means for operating said clutch means; and
   (g) a control cam driven by said drive means and engaging said clutch actuating means for operating said clutch means according to a predetermined program,
      (1) said clutch means including a driving pinion having a sawtooth serrated end face, a driven pinion having a matching sawtooth serrated end face, said clutch actuating means including means for engaging said end faces.

10. A timed control device according to claim 9, further comprising a motor, a control shaft driven by said motor, an output shaft coaxial therewith and having a gear in driving engagement therewith to provide rotation for said plurality of cams; means engaging said driving pinion with said central shaft and said driven pinion with said gear; and resilient means, yieldingly urging the serrated sawtooth end faces into engagement.

11. A timed control device according to claim 10, said driven pinion being in engagement with the lowest speed of rotation for said cams.

12. A timed control device according to claim 10, said gear being a stepped gear having a plurality of diameters, said driven pinion being in engagement with the largest diameter gear of the stepped gear.

13. A timed control device according to claim 12, an additional driving pinion having a serrated sawtooth end face, means engaging said additional pinion with said central shaft; an additional driven pinion having a matching, serrated sawtooth end face in engagement with another diameter gear of said stepped gear; means separating the serrated sawtooth end face of said additional driven pinion from engagement; said actuating means causing engagement of said serrated end faces of said additional pinions.

14. A timed control device according to claim 13, a plurality of additional driving and driven pinions, each having serrated sawtooth end faces, means engaging said additional plurality of driving pinions with said central shaft, and said plurality of driven pinions, each with a different diameter gear of said stepped gear; resilient means yieldingly separating each said serrated sawtooth end faces from engagement; said actuating means causing selective engagement of said serrated end faces.

15. A timed control device according to claim 14, wherein said actuating means is a rocker lever movably supported on a fulcrum in fixed relation to said pinions, said rocker lever having actuating arms in engagement with said pinions, said rocker lever, upon swinging about said fulcrum, engaging the serrated sawtooth end faces of selected pinions in opposition to the separating force of said yielding means.

16. A timed control device according to claim 15, wherein a pair of additional driving and driven pinions are provided, said fulcrum located between the axes of said pinions whereby, by rocking of the lever about the fulcrum, either the one or other of said additional pinions is engaged.

17. A stacked timer assembly for controlling a program comprising:
   (a) a plurality of disc-like cams;
   (b) a spindle rotatably supporting said cams in axial alignment;
   (c) free wheeling drive means engaging said spindle to rotate said cams;
   (d) a high speed drive means;
   (e) an auxiliary control cam in drive connection with said spindle; and
   (f) means controlled by said auxiliary control cam and connecting said spindle to said high speed drive means, in response to movement of said auxiliary control cam,
      (1) whereby the normal program may be interrupted for the duration of connection of said spindle to said high speed drive means, and the program steps occurring during the interruption succeed each other in rapid sequence in response to the higher speed of the connected high speed drive means,
      (2) said high speed drive means including means in driving engagement with said spindle and having a sawtooth serrated end face, a source of rotation of a speed higher than the speed of said free wheeling drive means, said source having a sawtooth serrated end face in matching and driving relation to said first-mentioned sawtooth serrated end face, means yieldably separating said sawtooth serrated end faces, said means controlled by said auxiliary control cam causing engagement of said sawtooth end faces.

18. A timed control device according to claim 17, a pair of high speed drive means providing a pair of speeds of rotation, said means controlled by said auxiliary control cam selectively causing engagement of either of said high speed drive means.

19. A timed control device according to claim 17, including a motor and a reduction gearing; resilient means securing in axial alignment said motor, reduction gearing, and high speed drive means for assembly with said stacked timer assembly.

References Cited by the Examiner

UNITED STATES PATENTS

| | | | |
|---|---|---|---|
| 2,420,874 | 5/1947 | Fowler | 200—38 X |
| 2,995,916 | 8/1961 | Sisson | 200—38 X |
| 3,033,999 | 5/1962 | Thornberg et al. | 307—141.4 |
| 3,053,947 | 9/1962 | Bowman et al. | 200—38 |
| 3,077,784 | 2/1963 | Laviana et al. | 200—38 X |

BERNARD A. GILHEANY, *Primary Examiner.*

H. B. GILSON, G. MAIER, *Assistant Examiners.*